3,021,353
DIETHYL 3,3,3-TRINITROPROPANEPHOSPHONATE AND PROCESS OF PREPARING SAME

Pliny O. Tawney, Passaic, N.J., assignor to United States Rubber Company, New York, N.Y., a corporation of New Jersey
No Drawing. Filed June 22, 1949, Ser. No. 100,749
2 Claims. (Cl. 260—461)

The subject of this invention is a new compound, the addition reaction product of trinitromethane and diethyl ethenephosphonate, viz., diethyl 3,3,3-trinitropropanephosphonate.

Although nitro-aliphatic compounds have been proposed for the formulation of explosives, their number and types have been restricted by the lack of a simple method for introducing a multiplicity of nitro groups into the compound and by frequent instability of the products.

I have now unexpectedly discovered that trinitromethane will react spontaneously with diethyl ethenephosphonate to form diethyl 3,3,3-trinitropropanephosphonate in good yield. Although this compound burns vigorously, it is difficult to ignite and is surprisingly stable to the ordinary mechanical and thermal shocks encountered in handling, packaging and shipping.

In a typical preparation of the new compound of my invention, substantially equimolecular proportions of trinitromethane and diethyl ethenephosphonate are brought together in any suitable manner and allowed to remain in contact until the reaction has attained the desired degree of completion, preferably until reaction is substantially complete. Preferably, the reaction is carried out in a suitable inert solvent for the reactants. Preferably, the reaction is effected at ambient temperature, that is, without applying extraneous heat. The reaction is slightly exothermic, the temperature usually rising less than 10° C. It is preferred to conduct the reaction under anhydrous conditions. The addition reaction of my invention takes place in the absence of catalyst.

Following reaction, the addition product may be isolated from the reaction mixture in any suitable manner. Distillation of the product itself should be avoided because of its unstable or explosive nature.

The preparation of my new compound is illustrated in the following example. All parts are by weight.

Example

To a solution of 3.02 parts of trinitromethane in 3.5 parts of anhydrous diethyl ether, 3.28 parts of diethyl ethenephosphonate are added. The temperature rises from 24 to 30° C. and the solution turns yellow within a few minutes. The solution is then allowed to stand for 36 hours. The ether is then removed by evaporation at 20 mm. at room temperature to yield 5.35 parts of diethyl 3,3,3-trinitropropanephosphonate, a pale orange, slightly viscous liquid, $n_D^{20}=1.4570$.

| Analysis | Percent C | Percet H | Percent N |
|---|---|---|---|
| Theory | 26.67 | 4.47 | 13.33 |
| Found | 26.29 | 4.17 | 13.50 |

This new compound burns with extreme rapidity, although it is difficult to ignite. It is not detonated by a heavy hammer blow. It is useful as an explosive.

Having thus described my invention, what I claim and desire to protect by Letters Patent is:

1. As a new compound, diethyl 3,3,3-trinitropropanephosphonate.

2. The process which comprises bringing together trinitromethane and diethyl ethenephosphonate at ambient temperature and thereby effecting addition reaction thereof, and recovering diethyl 3,3,3-trinitropropanephosphonate from the resulting reaction mixture.

No references cited.